Figure 1:
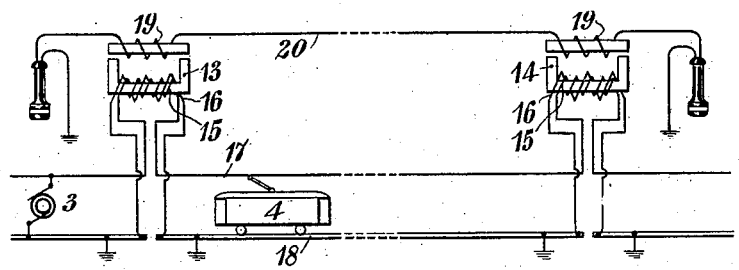

C. F. SCOTT.
PROTECTIVE MEANS FOR ELECTRICAL CIRCUITS.
APPLICATION FILED JULY 9, 1906.

969,498.

Patented Sept. 6, 1910.

WITNESSES:
C. L. Belcher
Otto S. Schairer

INVENTOR
Charles F. Scott
BY
Oksley S. Carr
ATTORNEY

UNITED STATES PATENT OFFICE.

CHARLES F. SCOTT, OF PITTSBURG, PENNSYLVANIA, ASSIGNOR TO WESTINGHOUSE ELECTRIC & MANUFACTURING COMPANY, A CORPORATION OF PENNSYLVANIA.

PROTECTIVE MEANS FOR ELECTRICAL CIRCUITS.

969,498.

Specification of Letters Patent.  Patented Sept. 6, 1910.

Application filed July 9, 1906. Serial No. 325,271.

*To all whom it may concern:*

Be it known that I, CHARLES F. SCOTT, a citizen of the United States, and a resident of Pittsburg, in the county of Allegheny and State of Pennsylvania, have invented a new and useful Improvement in Protective Means for Electrical Circuits, of which the following is a specification.

My invention relates to means for neutralizing and preventing disturbances in electrical circuits that may be caused by electro-magnetic induction from other circuits located in proximity thereto, and it is particularly applicable to the protection of telephone, telegraph and other circuits utilized for the transmission of intelligence that are paralleled for longer or shorter distances by circuits utilized for the transmission of power by alternating currents.

The object of my invention is to provide practical and efficient means of the character indicated.

When telephone, telegraph or other circuits are located in proximity to alternating current distributing circuits, electromotive forces are frequently induced therein, that may disturb and interfere with the transmission of intelligence. Consider, for example, an alternating current railway system in which a trolley wire constitutes one of the supply conductors and the track rails, or the track rails and the ground constitute the other. As a vehicle moves over the system, a primary circuit comprising a single convolution of variable length is formed, the magnetic field produced by which may induce an alternating electromotive force in a telephone, telegraph or other circuit that is located partially or wholly in proximity thereto. The electromotive force induced depends upon the distance between the intelligence-transmission system and the railway or power-transmission system, the current in the latter system, and the lengths of the circuits. It also depends upon the characters of the circuits; that is, the current in the railway system may all return by way of the track rails, or a part of it may return through the earth at a greater or less distance from the rails. On the other hand, the secondary circuit may be completely metallic, or it may have an earth return which may be near the surface or diffused through a considerable depth.

According to the present invention, I propose to neutralize the electromotive forces induced in intelligence-transmission and similar circuits by opposing thereto the electromotive forces of the secondary winding of a transformer, the primary winding of which is supplied from the power-transmission system.

Figure 2:
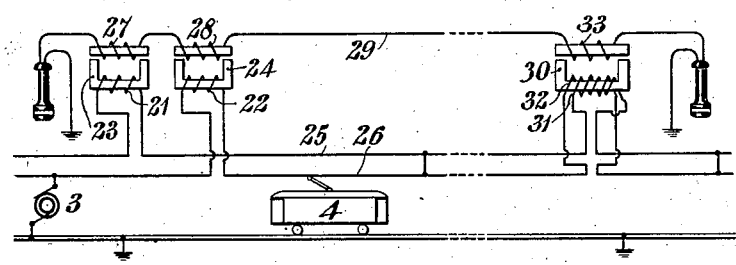

My invention will be more fully explained in connection with the accompanying drawings, Figure 1 of which is a diagrammatic view of a simple system arranged in accordance therewith, and Fig. 2 is a modification of the system of Fig. 1.

An electric railway system, that may be considered as representative of a suitable power-transmission system, comprises a trolley conductor and track rails that are supplied with alternating currents from any suitable source and are adapted to be electrically connected through the circuits of one or more vehicles. Located in proximity to the railway system, as for instance upon poles along or adjacent to the right of way of the railway, or at such distance therefrom as to be within the magnetic field set up thereby, is a conductor of an intelligence-transmission system, such, for example, as a telephone system. Connected at intervals in series with the trolley conductor are primary windings of transformers, the secondary windings of which are connected in series with the trolley conductor. The transformers are so designed and the windings thereof are so arranged that when the vehicle is located midway between the transformers the voltage impressed thereby upon the telephone system will be equal to and will oppose that induced therein directly from the railway system, and, to this end, the magnetizable cores are preferably provided with air gaps. As the amount of current in the railway system varies, the induced electromotive force in the telephone system will also vary, but, at the same time, the opposing voltage impressed upon it by the transformers will also vary and compensate for such changes.

The movements of vehicles upon the railway system vary the lengths of the primary circuits and it is consequently desirable that transformers be placed at comparatively frequent intervals in the systems, as will be readily understood from a consideration of specific examples.

It has been noted that the electromotive force induced in a circuit in proximity to a railway system depends upon the character of the circuits of the latter system; that is, the electromotive force induced in telephone or other systems will be greater when some of the current returns through the earth than when it all returns through the rails, and the values of the electromotive forces will usually increase as the distance of the earth conductor from the rail conductor increases. Ordinarily, the neutralizing transformers may be so proportioned as to compensate for given conditions, but when the position of the earth return conductor varies from time to time as it does with the condition of the earth, it is desirable to employ a system like that shown in Fig. 1, in which each of transformers 13 and 14 is provided with two primary windings 15 and 16 that are connected, respectively, in series with the trolley conductor 17 and the track rail sections 18 and with a secondary winding 19 which is connected in series with conductor 20 of the telephone system. The winding 16, which is in series with the track rail 18, is provided with a smaller number of convolutions than the winding 15, and is so arranged upon the core of the transformer that its magnetizing effect opposes that of the winding 15, the relative numbers of convolutions of the windings being determined, as will be presently understood, by the character of the circuit of the railway system. Suppose, for example, 20 volts to be induced in the secondary winding 19 by the winding 15 when acting alone and when 100 amperes traverse the trolley conductor 17, and that the winding 16 is provided with half as many convolutions as the winding 15. Then, when 100 amperes traverse the track rail 18, a resultant of 10 volts will be induced in the secondary winding 19 which may be assumed to afford the proper compensation in a given case if all of the current returns by the track rails; if only a half of the current returns by the rails, the resultant electromotive force induced in the secondary winding 19 of the transformer will be 15 volts. At the same time, however, a greater electromotive force will be induced in the telephone system because a larger amount of current in the railway system returns by way of the earth, so that an increase in the electromotive force impressed directly upon the circuit by the secondary winding 19 will be necessary to effect the proper compensation. Obviously, the relative numbers of convolutions of the primary windings of the transformers may be other than that here assumed and may be adjusted in accordance with the variable character of the return circuit of the railway system.

Railway systems are frequently provided with a plurality of trolley conductors, or with feeder conductors for the trolley conductors, and, in such cases, it may be necessary to compensate for the electromotive force induced by each of the conductors in a system that is located in proximity thereto. In order to effect this result, primary windings 21 and 22 of transformers 23 and 24 may be connected in series, respectively, with feeder conductor 25 and trolley conductor 26, and secondary windings 27 and 28 may be connected in series with conductor 29 of the telephone system as shown at the left in Fig. 2; or, if desired, a single transformer 30 may be provided with a plurality of primary windings 31 and 32, that may be connected in series, respectively, with the trolley and feeder conductors of the power-transmission system and secondary winding 33 of which may be connected in series with conductor 29 of the telephone system, as shown at the right of Fig. 2.

I claim as my invention:

1. The combination with conductors for alternating currents and another circuit conductor disposed in proximity thereto, of a transformer having primary windings of different numbers of convolutions in circuit, respectively, with the alternating current conductors, and a secondary winding in circuit with the other conductor.

2. The combination with conductors for alternating currents and another circuit conductor disposed in proximity thereto, of a transformer having primary windings in circuit, respectively, with the alternating current conductors, and a secondary winding in circuit with the other conductor.

3. The combination with conductors for alternating currents and another circuit conductor disposed in proximity thereto, of a transformer having opposing primary windings connected in circuit, respectively, with the alternating current conductors, and a secondary winding in circuit with the other conductor.

4. The combination with conductors for alternating currents and another circuit conductor disposed in proximity thereto, of a transformer having primary windings in circuit, respectively, with the alternating current conductors, and a secondary winding in circuit with the other conductor, the primary windings having different numbers of convolutions and the magnetizing effects thereof being opposed.

5. The combination with an electric railway, comprising a feeder conductor and a rail return divided into independent sections, of a signaling conductor, and a conductor electrically connecting said independent sections and disposed in proximity to said signaling conductor.

6. The combination with an electric railway, comprising a feeder conductor and a rail return divided into independent sections, of a signaling conductor, and a conductor electrically connecting said independent sections and disposed nearer to said signaling conductor than the distance between said signaling conductor and said feeder conductor.

7. The combination with an electric railway, comprising a feeder conductor and a rail return divided into independent sections, of a signaling conductor, and a conductor electrically connecting said independent sections and disposed for a relatively short distance substantially parallel to said signaling conductor and nearer thereto than the distance between said signaling conductor and said feeder conductor.

8. In combination, an electric railway, comprising a feeder conductor and rail return having independent track sections, a signaling conductor, and a conductor connected in series in said rail return, and a portion of said conductor, relatively small as compared with the length of the feeder conductor disposed in proximity to said signaling conductor.

9. In combination, an electric railway, comprising a feeder conductor and a rail return divided into independent sections, a signaling conductor, and a conductor connected in series between said sections of rail return and having a portion disposed in proximity to said signaling conductor and at a distance therefrom less than the distance between said signaling conductor and said feeder conductor.

10. In an electric railway system, the combination with a feeder conductor and a track return, a source of alternating current connected to said conductor and track return, a neighboring signaling conductor, and a conductor connected in series in the track return and disposed in proximity to said signaling conductor, whereby the inductive effects of said feeder conductor upon said signaling conductor are neutralized.

In testimony whereof, I have hereunto subscribed my name this 29th day of June, 1906.

CHAS. F. SCOTT.

Witnesses:
OTTO S. SCHAIRER,
BIRNEY HINES.